United States Patent [19]

Patterson, III et al.

[11] Patent Number: 4,567,627
[45] Date of Patent: Feb. 4, 1986

[54] LOAD BINDER APPARATUS

[75] Inventors: William W. Patterson, III, Sewickley; Eugene F. Grapes, Irwin, both of Pa.

[73] Assignee: W. W. Patterson Company, Pittsburgh, Pa.

[21] Appl. No.: 523,738

[22] Filed: Aug. 16, 1983

[51] Int. Cl.⁴ ............................................. B66F 3/08
[52] U.S. Cl. .............................. 24/68 CT; 254/100; 254/231
[58] Field of Search ............ 24/68 R, 68 CT, 68 CD, 24/68 D, 71 CT, 70 CT; 254/100, 204, 231, 234, 258, 259, 263; 410/12, 100, 103, 128

[56] References Cited

U.S. PATENT DOCUMENTS

| | | | |
|---|---|---|---|
| 775,355 | 11/1904 | Smith | 254/231 |
| 1,822,409 | 9/1931 | Lawrence | 254/100 X |
| 1,854,055 | 4/1932 | Montgomery | 254/100 |
| 2,120,497 | 6/1938 | Heinrich | 24/68 CT X |
| 2,630,296 | 3/1953 | Lucker | 254/100 X |
| 3,319,488 | 5/1967 | Bentley et al. | 254/98 X |
| 3,738,613 | 6/1973 | Hollis, Jr. | 254/98 X |
| 4,100,875 | 7/1978 | Patterson, III et al. | 254/100 X |
| 4,131,264 | 12/1978 | Patterson, III et al. | 24/68 CT |
| 4,157,171 | 6/1979 | Hasselås | 254/231 |
| 4,223,869 | 9/1980 | Patterson, III et al. | 24/68 CT |

FOREIGN PATENT DOCUMENTS 741950 9/1966 Canada ........................... 24/68 CT Primary Examiner—William E. Lyddane
Assistant Examiner—James R. Brittain
Attorney, Agent, or Firm—Buell, Ziesenheim, Beck & Alstadt

[57] ABSTRACT

A load binder or lashing tightener is provided made up of a first inner elongate sleeve member closed at one end, an anchor fitting on said closed end, a thread nut in the other end of said first sleeve, a second outer sleeve having one end adapted to telescope over the first inner sleeve, an anchor member on said second sleeve adjacent the other end, an elongate screw extending through the second sleeve, one end threadingly engaging the nut in said first sleeve, the other end rotatably fixed in the said other end of said second sleeve, a drive on said other end for rotating said screw whereby said second sleeve is caused to telescope over the first sleeve and the anchors on said sleeves are brought together and an anchor member at the said one end of said second sleeve adapted to receive the lashing to be tightened after the sleeves have been telescoped. The drive may be a hand knob protected by a spacer ring on the second sleeve.

6 Claims, 3 Drawing Figures

LOAD BINDER APPARATUS

The present invention relates to load binder apparatus and particularly to a quick power lashing mechanism for tightening lashing cables and chains and the like rapidly to bind or lash a load in place.

The present invention is an improvement over the invention disclosed and claimed in our U.S. Pat. No. 4,131,264 issued Dec. 26, 1978.

Load binders and lashings of many kinds have been employed in binding a load in place as for example on a truck bed, a ship deck or hold, a railway car, etc.

In the past, load binders have generally been of the ratchet type or the cam lever type. In the ratchet type binder, tightening is relatively slow. In the case of the cam lever type, they may be applied quickly but they have a very limited travel and are prone to come loose and release the load.

In our U.S. Pat. No. 4,131,264 we disclose a load binder or lashing tightener is provided which is made up of a first inner elongate sleeve member closed at one end, an anchor fitting on said closed end, a thread nut in the other end of said first sleeve, a second outer sleeve having one end adapted to telescope over the first inner sleeve, anchor means on said second sleeve adjacent the other end, screw means extending through the second sleeve, one end threadingly engaging the nut in said first sleeve, the other end rotatably fixed in the said other end of said second sleeve, drive means on said other end for rotating said screw whereby said second sleeve is caused to telescope over the first sleeve and the anchor means on said sleeves are brought together. The structure of that patent, like the prior art before it, was limited in the amount of movement that could be attained by the length of the screw which could be drawn into the barrel. In addition, it required the use of a separate wrench.

We have discovered an improved structure which eliminates these problems and makes it possible to make multiple take ups of the lashing being tightened. This can be accomplished without the need for a separate leverage arm and without danger of the drive screw being deformed.

We provide a load binder comprising a first elongate sleeve member closed at end and carrying an anchor fitting at said one end, the other end of said first sleeve is provided with a threaded nut fixed therein, a second sleeve member sufficiently larger in internal diameter so as to telescope over the first sleeve is provided, one end of said second sleeve receiving said other end of said first sleeve in telescopic relation, the other end of said second sleeve is provided with a collar through which extends a threaded screw engaged in the nut of the first sleeve and having a driver nut head whereby said screw is rotated in the nut to move the second sleeve relative to the first, an anchor fitting on said second sleeve adjacent said other end of said second sleeve, a take up fitting at the end of said second sleeve opposite the anchor fitting. Preferably, the screw is provided with load collars of bearing material fixed thereto on opposite sides of the swivel collar to provide reduced friction between the several collars. A stop or lock pin is preferably provided on the end of the screw within the first sleeve to prevent its removal from the nut. The anchor fittings are preferably in the form of clevises, however, they may be eye hooks, or any type of anchor fitting. The take up fitting is preferably in the form of a hook.

The driver nut head is preferably a hand knob and the second sleeve is preferably provided with a spacer ring adjacent said other end whereby the sleeve is held at an angle from any surface upon which it is placed to protect the hand knob and screw.

In the foregoing general description we have set out certain preferred objects, purposes and advantages of our invention. Other objects, purposes and advantages of this will, however, be apparent from a consideration of the following description and the accompanying drawings in which, FIG. 1 is a longitudinal sectional view of one embodiment of our invention;

FIG. 4 is a section of a third embodiment illustrating the use of hooks as the anchor means; and FIG. 5 is a section of a fourth embodiment illustrating the use of eyes as the anchor means.

Figure 1:
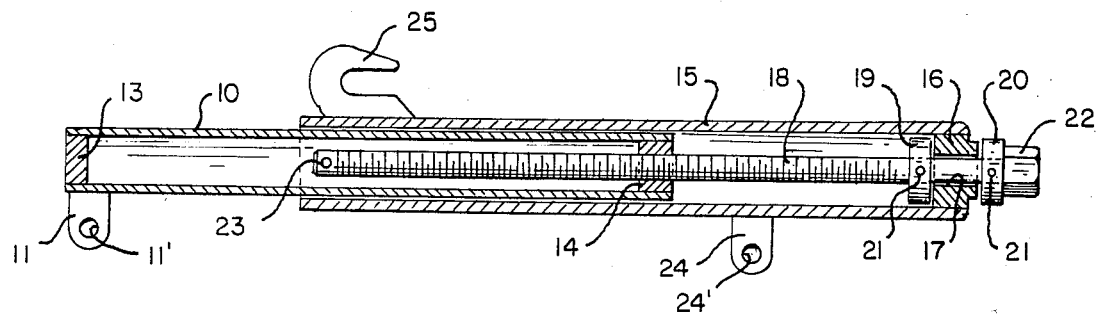

Referring to the drawings, we have illustrated in FIG. 1 a first sleeve member 10 of tubular cylindrical form having a clevis 11 welded on the sleeve 10 and a plug 13 welded in and closing one end of the sleeve. The other end of sleeve 10 is provided with an Acme threaded nut 14 welded thereon. A second cylindrical sleeve 15 is arranged to telescopically receive first sleeve 10 in one end thereof and is provided at the opposite end with a swivel collar 16 having a hole 17 through which passes Acme threaded screw 18. Screw 18 is provided at one end with spaced load collars 19 and 20 on opposite sides of swivel collar 16. Load collars 19 and 20 are preferably of bearing material such as brass or bronze and are held in place by pins 21. This same one end is provided with a driver nut 22 welded thereon for rotating the screw. The opposite end of the screw 18 passes through nut 14 in first sleeve 10 and is provided with a lock pin 23. A clevis 24 is fixed on the side wall of second sleeve 15 adjacent the end remote from clevis 11. A hook 25 is welded to sleeve 15 at the end opposite collar 16.

In use, the screw 18 is rotated to move the two sleeves apart as in FIG. 1; a pin (not shown) is inserted through holes 11' in clevis 11 and through a loop (not shown) in one end of a cable lashing, or a link (not shown) of a chain lashing as the case may be, another pin (not shown) is inserted through hole 24' in clevis 24 and through a loop (not shown) or a chain link (not shown) at the opposite end of the lashing. The nut 22 is engaged by a nut driver and rotated to run the screw 18 through nut 14 into the interior of sleeve 10 causing the sleeves to telescope, 15 over 10 and thus bring clevises 11 and 24 toward each other, tightening the cable or chain lashing. When the sleeve 10 is fully telescoped in sleeve 15, the chain or cable lashing being tightened is fastened to hook 25 and the lashing is released. The lashing is released by reversing the rotation of screw 18 to move the sleeves and clevises apart. The screw 18 is totally enclosed in this structure and is thus unaffected by dirt, weather or any of the circumstances which cause binders of the prior art to be inoperable or even fail. The chain or cable lashing being tightened is then again fastened to clevis 11 and tightening is repeated.

Figure 2:
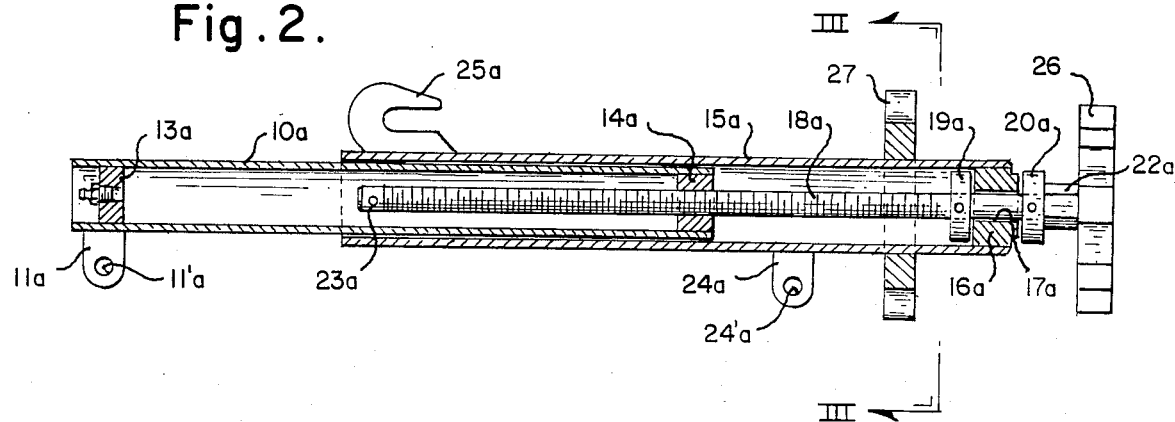
FIG. 2 is a longitudinal sectional view of a second embodiment of our invention.
Figure 3:
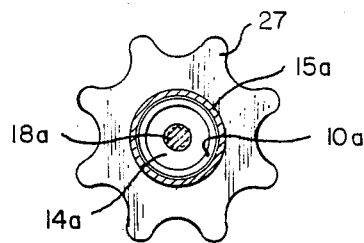
FIG. 3 is a section on the line III—III of FIG. 2.

In FIG. 2, we have shown a structure precisely like that of FIG. 1 with like parts bearing like numbers with the suffix a, except that in the embodiment we have provided a hand knob 26 instead of nut 22, of sufficient diameter to be readily rotated by hand. A spacer run or member 27 is fixed on sleeve 15 adjacent the end having collar 16 to prevent the hand knob 26 from touching the surface on which the device is placed. This prevents the screw from being bent in the event the binder is run over by a loader or other mobile equipment since the hand knob would extend beyond the diameter of the sleeve.

We have illustrated a driver nut head on the screw of our structure in FIG. 1, however, the screw could be provided with a bevel gear driver or a worm gear drive of known form with the drive at right angles to the screw.

The invention may take various embodiments including clevises, eyes and hooks. The structure can be made with the end of sleeve 10 threaded to interchangeably receive a threaded opening in a clevis or in an eye or a hook. Similarly, the second sleeve 15 could be provided with a projecting threaded stub interchangeably receiving a threaded clevis, eye or hook. Each clevis could be provided with a chain and hook as desired.

In FIG. 4, we have illustrated a structure essentially the same as that of FIG. 1 but having hooks 110 and 124 as anchoring means. In FIG. 5, we have illustrated a structure such as that of FIG. 2 in which the anchor means are eyes 111 and 114 each having an eye opening 111'a and 124'a.

While we have illustrated and described certain preferred practices and embodiments of our invention in the foregoing specification, it will be understood that this invention may be otherwise embodied within the scope of the following claims.

We claim:

1. A tightener apparatus for load binders and lashings comprising a first inner elongate sleeve member closed at one end, an anchor means on said closed end adapted to receive a lashing to be tightened, a threaded nut in the other end of said first sleeve, a second outer sleeve having one end adapted to telescope over the first inner sleeve and relatively rotate with respect thereto, anchor means on said second sleeve adjacent the other end for anchoring the apparatus to one of a base member and a second lashing, screw means extending through the second sleeve, one end of said screw means threadingly engaging the nut in said first sleeve, the other end rotatably fixed in the said other end of said second sleeve, drive means on said other end of said screw means for rotating said screw whereby said second sleeve is caused to telescope over the first sleeve and the anchor means on said sleeves are carried toward each other and second anchor means at said one end of said second sleeve adapted to receive the lashing to be tightened after the sleeves have been telescoped and having a hand knob as a drive means and a spacer means on said second sleeve intermediate its ends shaped so as to prevent the hand knob from touching a surface upon which the binder is placed in any unsupported position whereby the hand knob and screw means are protected from being bent in the event the tightener is run over.

2. A tightener apparatus for load binders and lashings as claimed in claim 1 wherein the drive means is a driver nut head on the screw.

3. A tightener apparatus for load binders and lashings as claimed in claim 1 wherein the anchor means on each of said sleeves is a clevis.

4. A tightener apparatus for load binders and lashings as claimed in claim 1 wherein the anchor means on each of said sleeves is a hook.

5. A tightener apparatus for load binders and lashings as claimed in claim 1 wherein the anchor means on each said sleeves is an eye.

6. A tightener apparatus for load binders and lashings as claimed in claim 1 wherein the spacer means is a star shaped metal member.

* * * * *